(12) United States Patent
von Borstel et al.

(10) Patent No.: US 6,709,118 B2
(45) Date of Patent: Mar. 23, 2004

(54) DEVICE FOR THE BEAM GUIDING OF A LASER BEAM

(75) Inventors: Michael von Borstel, Pleidelsheim (DE); Michael Häcker, Winsheim (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 10/082,592

(22) Filed: Feb. 22, 2002

(65) Prior Publication Data

US 2002/0163700 A1 Nov. 7, 2002

(30) Foreign Application Priority Data

Feb. 22, 2001 (EP) ............................................. 01104277

(51) Int. Cl.[7] .............................................. G02B 7/182
(52) U.S. Cl. ..................................................... 359/872
(58) Field of Search ............................... 372/20, 55, 58, 372/60, 61, 65; 359/872, 873, 877, 198

(56) References Cited

U.S. PATENT DOCUMENTS 3,771,066 A * 11/1973 Burgwald et al. ............. 372/20

* cited by examiner

*Primary Examiner*—Euncha Cherry

(57) ABSTRACT

The invention relates to a device for the beam guiding of a laser beam with at least one optical element and with a housing that has a first housing section, which can be fitted at least partially into a support body of a power laser or beam guiding system or can be attached thereto, and a further housing section that at least partially encloses the optical element, wherein a one-piece housing is provided, into which the optical element can be fitted, and wherein a bearing surface for the optical element is provided, which bearing surface at least partially encloses the housing opening and has a coating with a surface that is harder than the housing material.

21 Claims, 4 Drawing Sheets

DEVICE FOR THE BEAM GUIDING OF A LASER BEAM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a device for the beam guiding of a laser beam with at least one optical element with a housing, which has a first housing section that is fittable at least partially into a support body of a power laser or beam guiding system or attachable thereto, and a further housing section that at least partially encloses the optical element.

TECHNICAL FIELD

Laser technology is used in a very wide variety of technical fields. For example, high-power lasers are used for flexible material processing. These power lasers have a resonator in which the laser light is generated. This resonator contains a back mirror as well as an output mirror, which is semitransparent so that a certain proportion of the laser light can leave the resonator in order, for example, to carry out the material processing. To increase the power in power lasers, it is necessary to increase the length of the discharge path in the resonator. In order to meet this requirement with a sufficiently small construction size, $CO_2$ power lasers have been developed whose resonator is folded so that the light path is long despite a compact design. A separate gas discharge is generated in each path section of the folded $CO_2$ power laser. Deflecting mirrors are provided at the end of the discharge path, so that the beam can be guided in the folded resonator.

The transmission and reflection factors of the optical elements used for the beam guiding are designed and matched differently according to the function. Optical elements that permit total reflection are employed, as well as optical elements that permit partial transmission with various transmission factors.

For deflecting a laser beam in a power laser, use is made of an optical element that routes the beam by total reflection. To that end, a device is provided which has a first housing section with a housing opening, which housing section is provided at least partially in a support body of the power laser. The opening of the first housing section is provided in the deflection region of the laser beam of the folded power laser. A second housing section is fixed to this first housing section by a screw connection, and is in turn mounted on the support body via a screw connection. This second housing section receives a holder that at least partially encloses the optical element. Using a further screw connection, this holder is mounted at the second housing section, so that the optical element is positioned at the opening in the first housing section and closes this opening.

The first housing section is made of stainless steel, in order to form a hard and even bearing surface at least in the edge region of the housing opening for the optical element. The second housing section is made of an aluminum alloy that is inexpensive to produce and permits good dissipation of the heat, which is absorbed during the deflection of the beam in the optical element. For better cooling, the holder of the optical element is designed in two parts and has, in a region opposite the housing opening of the first housing section, a cooling unit fitted into the holder with a feed channel and a discharge channel for the coolant. By passing the coolant close to the rear side of the optical element, better cooling is achieved in this region than in the second housing section and in the less thermally conductive first housing section.

During the operation of a power laser, the heating of the optical element and the heating of the two-part housing, consisting of different materials, leads to differential thermal expansion. Especially in the region where the first and second housing sections are screwed, increased stresses are induced which lead to unevenness of the bearing surface of the optical element and affect the deflection of the laser beam. The result of this is drifting of the mode when the stressed bearing surface is heated. This causes deviations in the intensity distribution of the mode, so that the achievable power and beam quality are reduced. At the same time, the unevenness of the bearing surface causes the optical element to tilt, which likewise has an effect on the mode drift.

SUMMARY OF THE INVENTION

It is therefore an object of the invention to provide a device for the beam guiding of a laser beam with an optical element, which permits an even and hard bearing surface for complete bearing of the optical element and good thermal dissipation.

This object is achieved by a device for beam guiding of a laser beam with at least one optical element and with a housing, which has a first housing section that is fittable at least partially into a support body of a power laser or beam guiding system or attachable thereto, and a further housing section that at least partially encloses the optical element, wherein a one-piece housing is provided, into which the optical element is fittable, and in that a bearing surface for the optical element is provided, which bearing surface at least partially encloses a housing opening and has a coating with a surface that is harder than a material from which the housing is made.

Through the combination of the one-piece housing with a harder surface than the housing material at the bearing surface for the optical element, an evenness is achieved which is increased by at least a factor of two compared with the prior art. The high degree of evenness that is achieved in this way has the advantage that improved thermal conduction is obtained by increased surface contact between the housing and the optical element, so as to dissipate the heat absorbed in the optical element. When the heating of the optical element and of the housing is reduced, the thermal effects that cause drifting of the mode are commensurately less.

Owing to the one-piece housing, it is possible to avoid stresses acting on the bearing surface due to different expansion coefficients of a material pair. The one-piece design also avoids stresses between the separate first and second housing sections due to the screw connection, so that a further interfering factor for the evenness of the bearing surface is eliminated. Furthermore, a cumulative effect of tolerances when assembling a first and second housing section can no longer occur.

Owing to the coating surface which is harder than the housing material, damage to the bearing surface when mounting the optical element, which leads to distortion of the bearing surface and would entail tilting of the optical element, can be prevented. Precise beam guiding is therefore achieved.

Furthermore, the configuration of the one-piece housing and of the coating provided on the bearing surface has the advantage of providing good thermal dissipation throughout the housing, especially from the region of maximum heating, the optical element, into the one-piece housing which extends to the immediate vicinity of the housing opening. At the same time, the one-piece housing has the advantage that uniform heating of the housing and of the holder for the optical element is obtained during operation, which leads to uniform expansion. The evenness of the bearing surface is therefore maintained even during operation.

Initial trials have shown that the configuration according to the invention can reduce the heating of the optical element by more than 20° C.

Furthermore, the one-piece configuration of the housing can save on material costs as well as assembly costs.

The device has a housing made from a material with high thermal conductivity, for example a light metal alloy, in particular aluminum alloy. In this way, faster transport of heat outwards from the beam path and the optical element can take place, in order to keep the heating small. Aluminum alloys furthermore have the advantage that they can be processed easily and precisely.

According to another configuration of the invention, the coating of the bearing surface is provided using transition metals, for example nickel, molybdenum, chromium, rare earths or the like. This coating is preferably applied by a chemical process, vapor deposition process, by growth of layers or the like. Besides the said materials, it is also possible to provide other layers that have a hard surface and a high degree of evenness. Alternatively, a region enclosing the housing opening may also be treated by a hardening process, so that the bearing surface for the optical element has a hard surface with a high degree of evenness. In the case of coating processes that do not directly achieve the requisite evenness, the coating is post-processed.

The coating has a layer thickness of at least 20 $\mu$m. This makes it possible to ensure that complete processing of the entire coating is possible after application, and a sufficient layer thickness is left. In fact, the preferred coating material nickel has a low thermal conductivity. Since the heat flux through the surface is proportional to the temperature difference and thermal conductivity, and inversely proportional to the layer thickness, the low thermal conductivity is compensated for by the extremely small layer thickness. Overall, for a fixed heat flux that needs to be dissipated, a very small temperature difference is obtained in the coating.

According to another configuration, the coated bearing surface is processed by turning or milling with diamond, polycrystalline diamond (PCD), ceramics as well as grinding, precision turning or lapping. An evenness of the bearing surface, which is less than 1 $\mu$m, preferably less than 0.5 $\mu$m, can therefore be achieved. Owing to the high-precision even bearing surface, good thermal conduction from the optical element into the housing is obtained. Furthermore, the optical element can be arranged in the device while being virtually free from any tilting.

According to another configuration of the invention, the housing has at least one cooling channel, which is provided in the housing level with the optical element and at least partially encloses the latter. The one-piece configuration of the housing makes it possible to provide the cooling immediately next to the optical element, in order to increase the thermal dissipation. Advantageously, a cooling channel is provided which is arranged symmetrically with respect to the optical element and fully encloses the optical element. In the ideal case, the cooling channel is designed in such a way that the shape of the cooling channel corresponds to the shape of the optical element; for example, in the case of a circular optical element, the cooling channel is annularly designed. Since an annular cooling channel is very expensive to produce in terms of manufacturing technology, the annulus is approximated, for example, by an equilateral parallelogram. A feed channel and a discharge channel open into the cooling channel, preferably while being offset from one another by an angle of 180°.

According to another configuration of the invention, the optical element is designed as a silicon or copper mirror, or made of zinc selenide, gallium arsenide or diamond, which may be used as a deflecting mirror, partial-transmission mirror, output element or back mirror, depending on the transmission and the reflection factor.

Owing to the low heating of the optical element by virtue of the inventive device for receiving the element, a silicon mirror for example, which has to date been used only in a power laser with a maximum power of 3 kW, may now even be used, for example, in a 4 kW power laser. These silicon mirrors are less expensive to manufacture than other optical elements that can be used with an increased laser power, and are therefore preferred.

BRIEF DESCRIPTION OF THE DRAWINGS

Exemplary embodiments of the invention will be described in more detail in the following description and the drawings, in which.

DETAILED DESCRIPTION OF THE INVENTION

Figure 1:
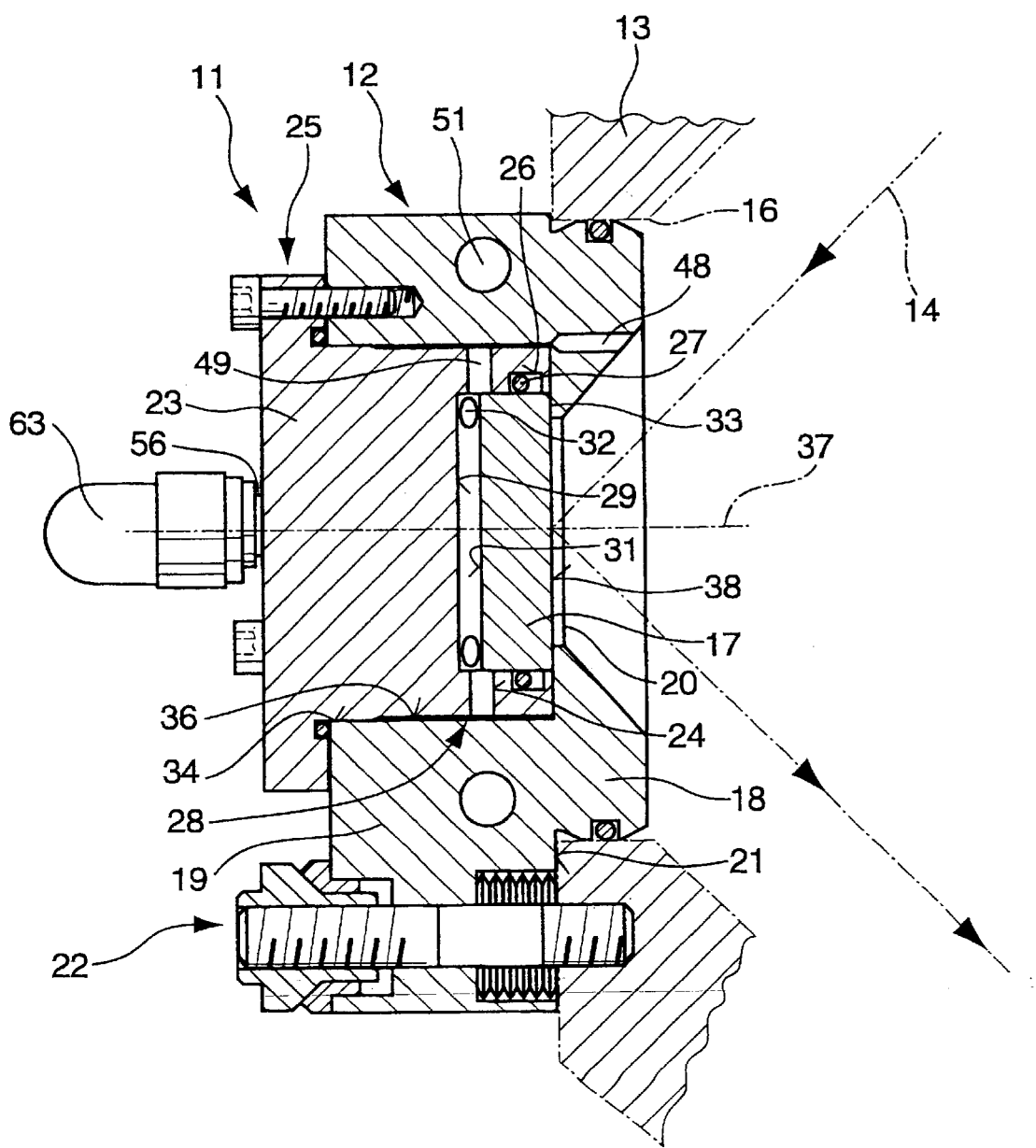
FIG. 1 shows a schematic full cross section of a device according to the invention.

FIG. 1 represents a device 11 for the beam guiding of at least one laser beam 14 in full cross section. This device 11 is a component of a power laser. A gas laser, for example, in particular a $CO_2$ laser, is used as the power laser. The exemplary embodiment described in more detail below is used for deflecting a laser beam 14. Depending on the transmission factor of the optical element 17 and the design of a holder 23 for the optical element 17, this device 11 can be used in power lasers for output and reflection of the beam as well as for monitoring the power of a laser beam with a semitransmissive optical element. A preferred exemplary embodiment of the invention will be explained below by way of example with reference to the function as a deflecting mirror.

The device 11 has a housing 12, which is fixed to a support body 13 of a power laser in corner or end regions for deflecting a laser beam 14. The housing 12 has a first housing section 18, which is fitted in a vacuum-tight fashion into a bore 16 of the support body 13 in the corner region. This housing section 18 is followed by a further housing section 19, which has a larger flange surface 21 than the first housing section 18, in order to fix the device 11 to the support body 13 via a screw connection 22.

The further housing section 19 is designed in one-piece with the first housing section 18. A holder 23, which receives an optical element 17 and at least partially encloses it, is fitted into the further housing section 19. To that end, the holder 23 contains a bore 24 in which the optical element 17 is radially guided. In the edge region of the bore 24, a groove 26 is provided for positioning a seal 27 in it. This seal 27 has essentially a retaining function for the optical element 17, so that the holder 23, or the optical element 17, can be fitted safely into a bore 28 of the housing section 19. Between a bottom 29 of the bore 24 and a rear side 31 of the optical element 17, a spring element 32 is provided which resiliently fixes the optical element 17 against a bearing surface 33 next to a housing opening 20 of the first housing section 18.

Figure 2:
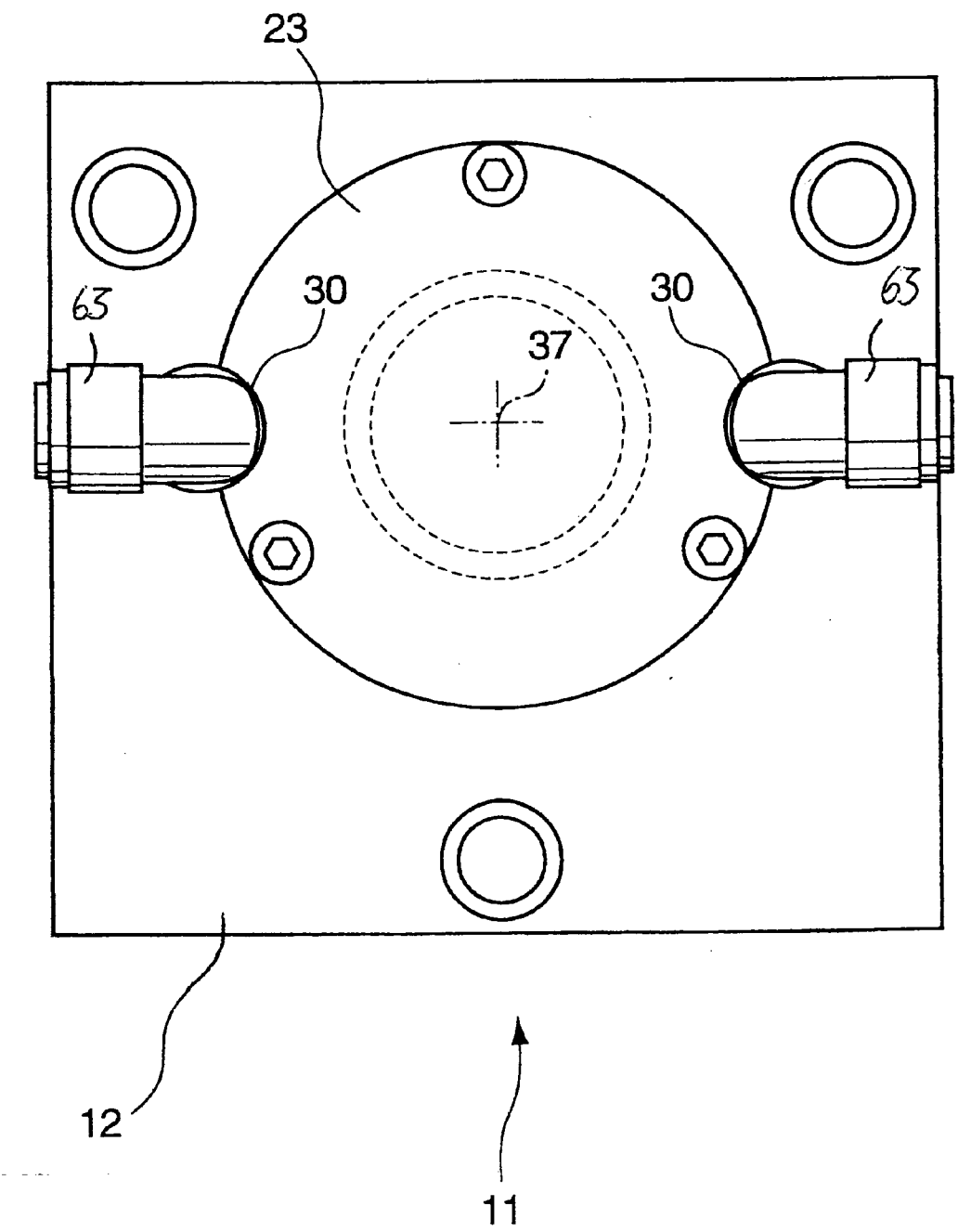
FIG. 2 shows a schematic plan view of the device according to the invention as shown in FIG. 1.

The holder 23 is advantageously fixed to the housing 12 via a screw connection, as represented in FIG. 2. The radial guiding of the holder 23 in the bore 28 is carried out by means of a circumferential surface 34 which is designed with a slightly larger diameter than the further circumferential surface 36 extending in the bore 28. Notches 30 (FIG. 2), which are mutually offset by 180°, are provided on an annular shoulder 25 enclosing the holder 23. These notches 30 interact with feed and discharge elements of a cooling system, which are described in more detail below, and form an antirotation mechanism for the holder 23 about the geometrical axis 37, so that the optical element 17 comes to bear against the bearing surface 33 without any component of rotational movement about the axis 37. The optical element 17 is centrally aligned with respect to the geometrical axis 37 by means of the housing 12 and the holder 23. The surface, or deflecting surface 38, of the optical element 17 is advantageously positioned in such a way that the beam guiding or deflection lies in the geometrical axis 37.

The housing 12 is made of a material with high thermal conductivity. An aluminum alloy is advantageously used. The holder 23 is also made of a material with high thermal conductivity, the same material as for the housing 12 preferably being used.

Figure 3:
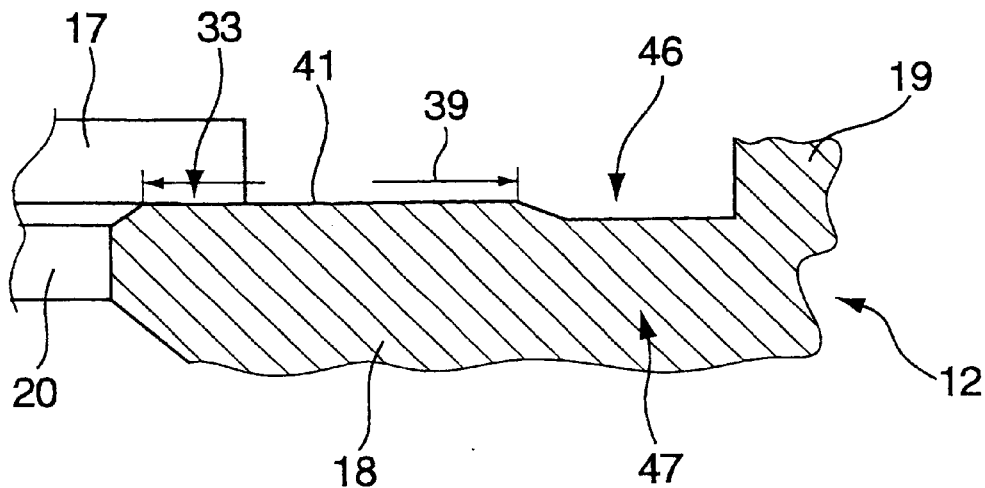
FIG. 3 shows an enlarged detail representation of the bearing surface for the optical element.

The bearing surface 33 of the first housing section 18, which is represented further in FIG. 3, has an annular surface 39 with a coating 41. This coating 41 is produced by chemical nickeling or CVD. Other processes and materials are also possible. In the case of coating processes that do not directly achieve the requisite uniformity, the coating is post-processed. A layer thickness of, for example, 100 $\mu$m is applied before the coating 41 is brought to the final dimension by finishing. The finishing may involve turning or milling with diamond, polycrystalline diamond (PCD), ceramics as well as grinding, precision turning and lapping. The layer thickness of the coating 41 is dimensioned in such a way that, after the processing, a minimum layer thickness of at least 20 $\mu$m is provided, so that a coating 41 that gives full surface coverage for the annular surface 39 is provided after the processing. Regarding the coating 41, it is necessary for it to have a hard surface as protection against scratches or damage, which is furthermore very even in order to achieve good thermal conduction and stable bearing for the optical element. The annular surface 39 is designed to be of the same size or larger than the required bearing surface 33 for the optical element 17. The maximum diameter of the annular surface 39 is advantageously matched to the largest optical element 17, which is used for the housing size. The annular surface 39 of the first housing section 18 is raised by a step 47 in relation to a further annular surface 46. A bore 48 (FIG. 1), which forms a connection to the vacuum in the resonator cavity, opens into this annular surface 46. This bore 48 is also in communication via a gap, formed by the circumferential surface 36 with the bore 28, and a further bore 49 with the back space of the optical element 17.

Figure 4:
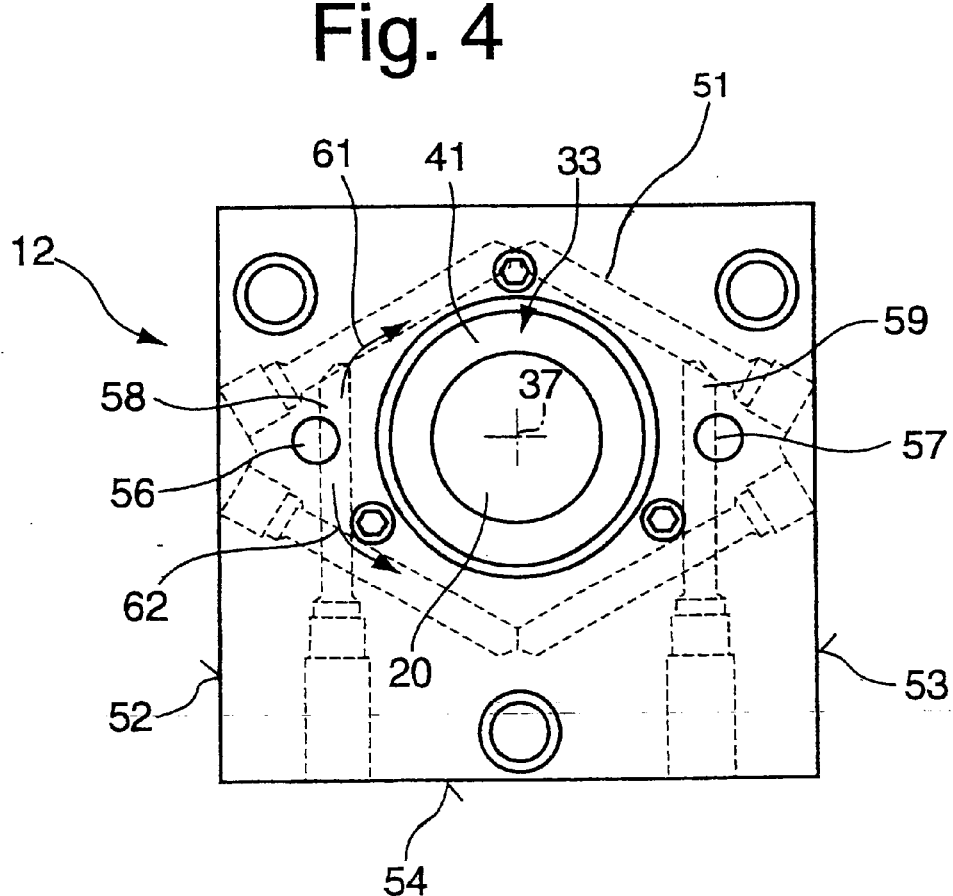
FIG. 4 shows a schematic view of the housing of the device according to the invention with cooling channels.

According to FIG. 4, the housing 12 has a cooling system, which is formed by a cooling channel 51 that encloses the optical element 17 as an annular channel. The cooling channel 51 is provided as close as possible to the bearing surface 33, as shown by the sectional representation in FIG. 1. It can be seen from the plan view in FIG. 4 that bores, for example arranged in a V-shape, are introduced from a left and right side surface 52, 53 in order to enclose the optical element 17. Using further bores, which are introduced from a side surface 54, an annular channel is formed. The openings of the bores that point towards the side walls 52, 53 and 54 are closed off by stoppers, so that they are sealed against the medium.

A feed channel and a discharge channel 56, 57 are provided perpendicular to a cooling-channel section 58, 59 of the annular channel. The feed and discharge are arranged separately from one another, so that the coolant flows simultaneously around the optical element 17 according to the arrow directions 61 and 62, so as to permit uniform cooling.

Angle connectors 63 are provided on the feed and discharge channels 56, 57, as represented in FIGS. 1 and 2. This arrangement has the further advantage that it is easy to assemble the housing 12 with the support body 13. Furthermore, for fitting and extraction of the optical element 17, the holder 23 can be removed from the housing 12, and fitted into it, freely from the feed and discharge of the cooling system.

Figure 5:
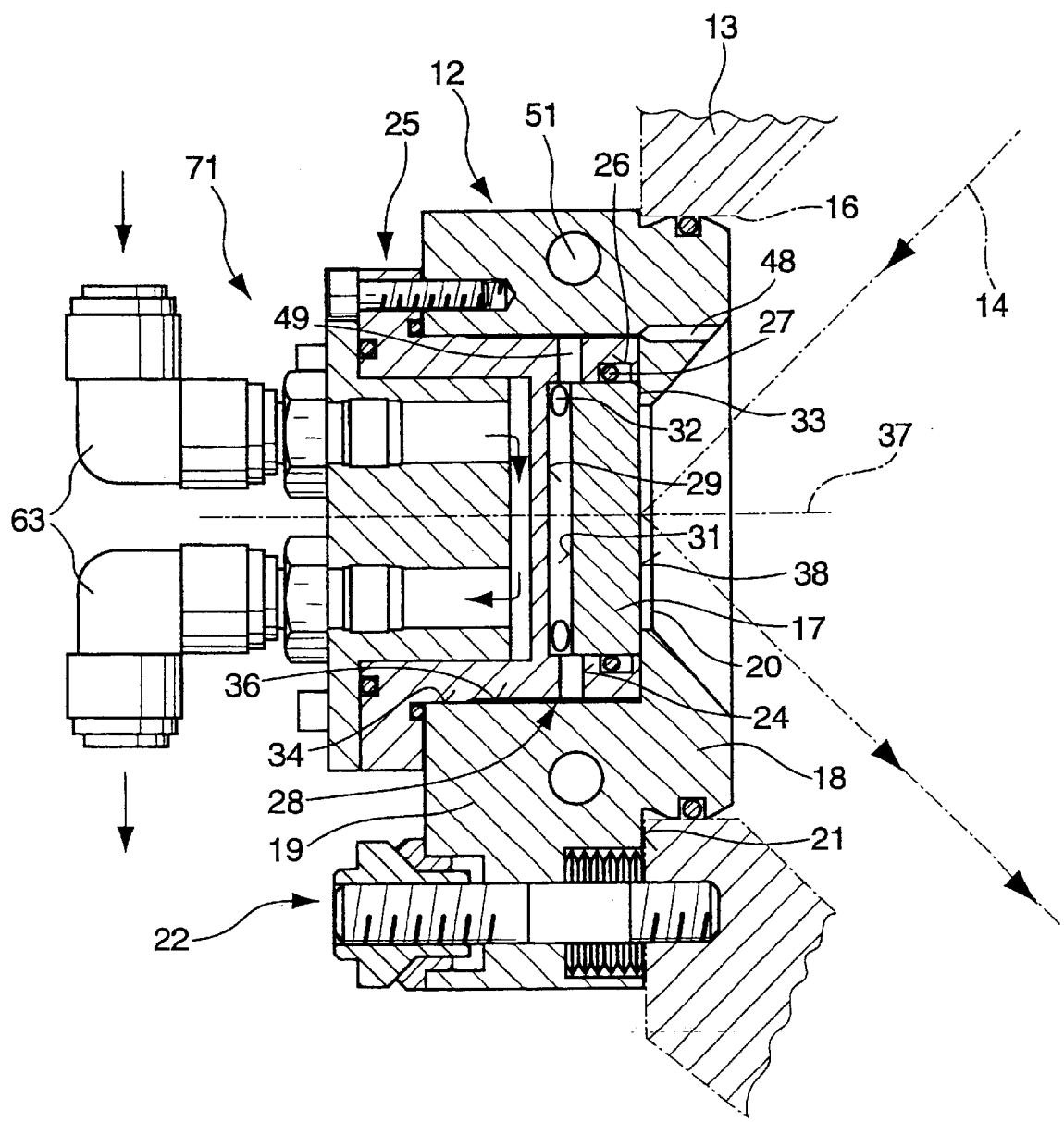
FIG. 5 shows a schematic full cross section of an alternative embodiment to FIG. 1.

FIG. 5 represents an alternative embodiment to FIG. 1. When there is greater need for heat dissipation, the holder 23 may receive a further cooling insert 71 in order to cool the optical element 17. This cooling insert 71 is designed in such a way that coolant flows around the bottom 29 of the holder 23, so that good thermal dissipation is obtained by means of the spring element 32 and the bottom 29. This arrangement and configuration of the cooling insert 71 may be implemented selectively as an extra measure for increased cooling demand. The use of the cooling insert 71 also depends on the material that is used for the optical element 17 and/or the housing 12, as well as the power of the high-power laser.

We claim:

1. A device for beam guiding of a laser beam with at least one optical element and with a housing, which has a first housing section that is fittable at least partially into a support body of a power laser or beam guiding system or attachable thereto, and a further housing section that at least partially encloses the optical element, wherein a housing is made of one piece and comprising the first housing section and the further housing section, into which the optical element is fittable, and the housing further comprises a bearing surface for the optical element, which bearing surface at least partially encloses an opening in the housing and has a coating with a surface that is harder than a material from which the housing is made.

2. The device according to claim 1, wherein the housing is made from a material with high thermal conductivity.

3. The device according to claim 2 wherein the housing is made of a light metal alloy or aluminium alloy.

4. The device according to claim 2, wherein the thermal conductivity of the housing material is more than 150 J/smK.

5. The device according to claim 1, wherein the coating of the bearing surface is provided using transition metals.

6. The device according to claim 5, wherein the coating of the bearing surface is provided with nickel, molybdenum, chromium or the like.

7. The device according to claim 1, wherein the coating has a layer thickness of at least 20 μm.

8. The device according to claim 1, wherein the coating is processed by turning or milling with diamond, polycrystalline diamond (PCD), ceramics as well as grinding, precision turning or lapping.

9. The device according to claim 1, wherein the coating has an evenness of less than 1 μm.

10. The device according to claim 1, wherein the bearing surface comprises at least as a partially coated annular surface.

11. The device according to claim 1, wherein the bearing surface comprises a fully coated annular surface.

12. The device according to claim 1, wherein the housing has at least one cooling channel, which is provided in a housing level with the optical element and at least partially encloses the optical element.

13. The device according to claim 12, wherein the cooling channel is arranged symmetrically with respect to the optical element and fully encloses the optical element.

14. The device according to claim 12, wherein the cooling channel is supplied by a feed channel and a discharge channel.

15. The device according to claim 14, wherein the feed channel and the discharge channel are arranged perpendicular to the cooling channel.

16. The device according to claim 14, wherein the feed channel and the discharge channel are open into the cooling channel with a mutual offset of 180°.

17. The device according to claim 1, wherein the optical element is enclosed at least partially by a holder.

18. The device according to claim 1, wherein the optical element is fitted in the further housing section.

19. The device according to claim 1, wherein the element comprises a mirror selected from a deflecting mirror, partial-transmission mirror, output element or total-reflection mirror.

20. The device according to claim 1, wherein a gas laser, is provided as a power laser.

21. The device according to claim 19, wherein the mirror is made of silicon, zinc selenide (ZnSe), gallium arsenide (GaAs), diamond or copper.

* * * * *